United States Patent
Roy et al.

(10) Patent No.: US 7,066,076 B2
(45) Date of Patent: Jun. 27, 2006

(54) MOTOR-DRIVEN, BOOM-MOUNTED ROTARY COUPLING

(75) Inventors: Michel Roy, Ste-Justine (CA); Mario Dubreuil, Ste-Germaine Station (CA); Sylvain Talbot, Charlesbourg (CA); Denis Goudreau, Ste-Rose (CA)

(73) Assignee: Rotobec Inc., Ste-Justine (CA)

( * ) Notice: Subject to any disclaimer, the term of this patent is extended or adjusted under 35 U.S.C. 154(b) by 106 days.

(21) Appl. No.: 10/483,411

(22) PCT Filed: Jul. 17, 2002

(86) PCT No.: PCT/CA02/01111

§ 371 (c)(1),
(2), (4) Date: Jan. 20, 2004

(87) PCT Pub. No.: WO03/008716

PCT Pub. Date: Jan. 30, 2003

(65) Prior Publication Data

US 2004/0168568 A1    Sep. 2, 2004

(30) Foreign Application Priority Data

Jul. 18, 2001    (CA) .................................. 2353239

(51) Int. Cl.
*F01B 31/00*    (2006.01)
(52) U.S. Cl. ........................ 92/106; 414/738
(58) Field of Classification Search ............... 414/738, 414/739; 92/106; 37/186, 187
See application file for complete search history.

(56) References Cited

U.S. PATENT DOCUMENTS

| 3,359,564 A | 12/1967 | Dean |
| 3,873,133 A | 3/1975 | Berg et al. |
| 3,902,614 A | 9/1975 | Roberts et al. |
| 3,908,695 A | 9/1975 | Dunbar |
| 3,914,886 A | 10/1975 | Berg et al. |
| 3,917,322 A | 11/1975 | Berg et al. |
| 3,966,249 A | 6/1976 | Lindqvist |
| 4,005,895 A | 2/1977 | Cullings |
| 4,426,110 A | 1/1984 | Mitchell et al. |

(Continued)

FOREIGN PATENT DOCUMENTS

WO    WO 99/37136    7/1999

*Primary Examiner*—F. Daniel Lopez

(74) *Attorney, Agent, or Firm*—Ogilvy Renault LLP

(57) ABSTRACT

A rotor assembly for rotating and actuating a working implement, comprising a load-bearing shaft adapted to be mounted to a boom member displacing the rotor assembly. Actuation means are secured to the load-bearing shaft. A drive assembly is rotatably mounted about the load-bearing shaft and is coupled to the actuation means. The drive assembly is adapted to be connected to a working implement so as to transmit actuation from the actuation means to the working implement to drive the working implement about the load-bearing shaft. A collector assembly is rotatably mounted to the load-bearing shaft and is adapted to receive a pressure supply therefrom. The collector assembly is provided with connector means adapted to provide the working implement with the pressure supply. The collector assembly is coupled to the drive assembly so as to rotate therewith upon actuation from the actuation means, and so as to be independent from the drive assembly to substantially avoid being subjected to loads between the working implement and the load-bearing shaft or the drive assembly.

11 Claims, 8 Drawing Sheets

U.S. PATENT DOCUMENTS

| | | |
|---|---|---|
| 4,542,929 A | 9/1985 | Possinger |
| 4,576,406 A | 3/1986 | Johnson et al. |
| 4,985,981 A | 1/1991 | Wang |
| 5,267,504 A | 12/1993 | Weyer |
| 5,330,242 A | 7/1994 | Lucky, Sr. |
| 5,375,329 A | 12/1994 | Morikawa et al. |
| 5,441,090 A | 8/1995 | Hill et al. |
| 5,979,207 A | 11/1999 | Seidl et al. |

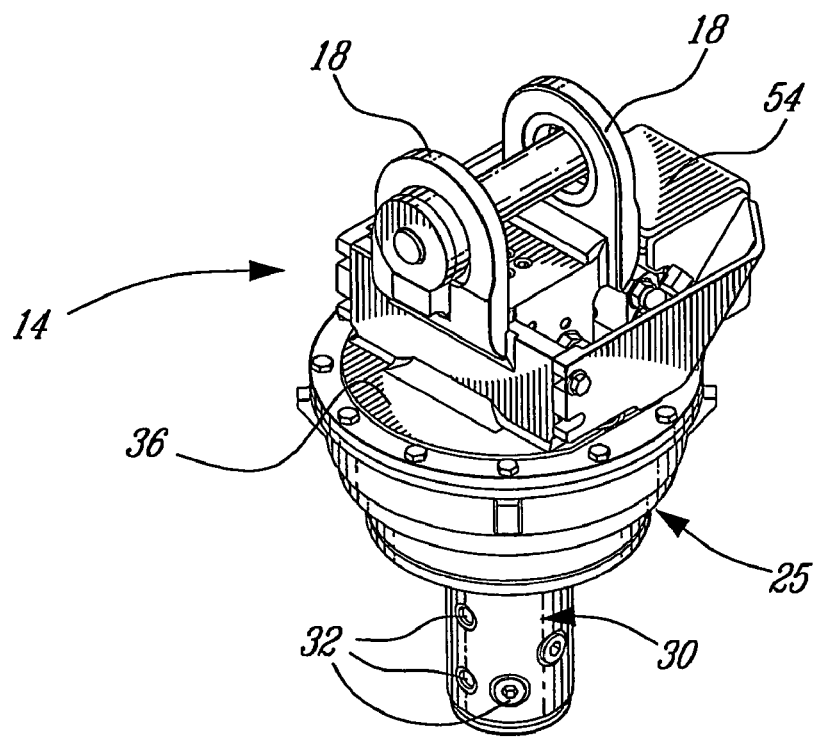
FIG_3A
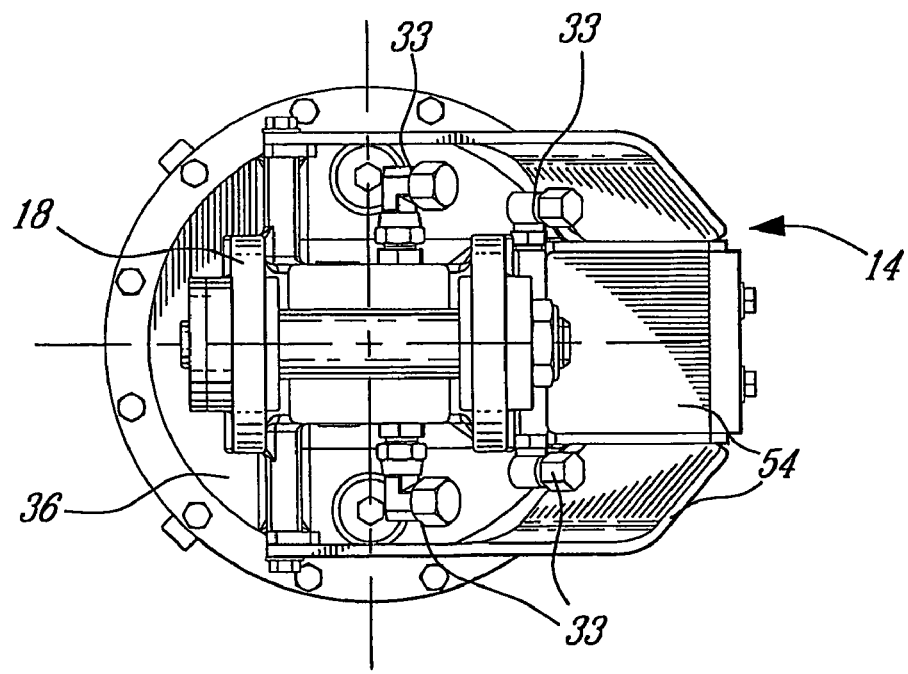
FIG_3B

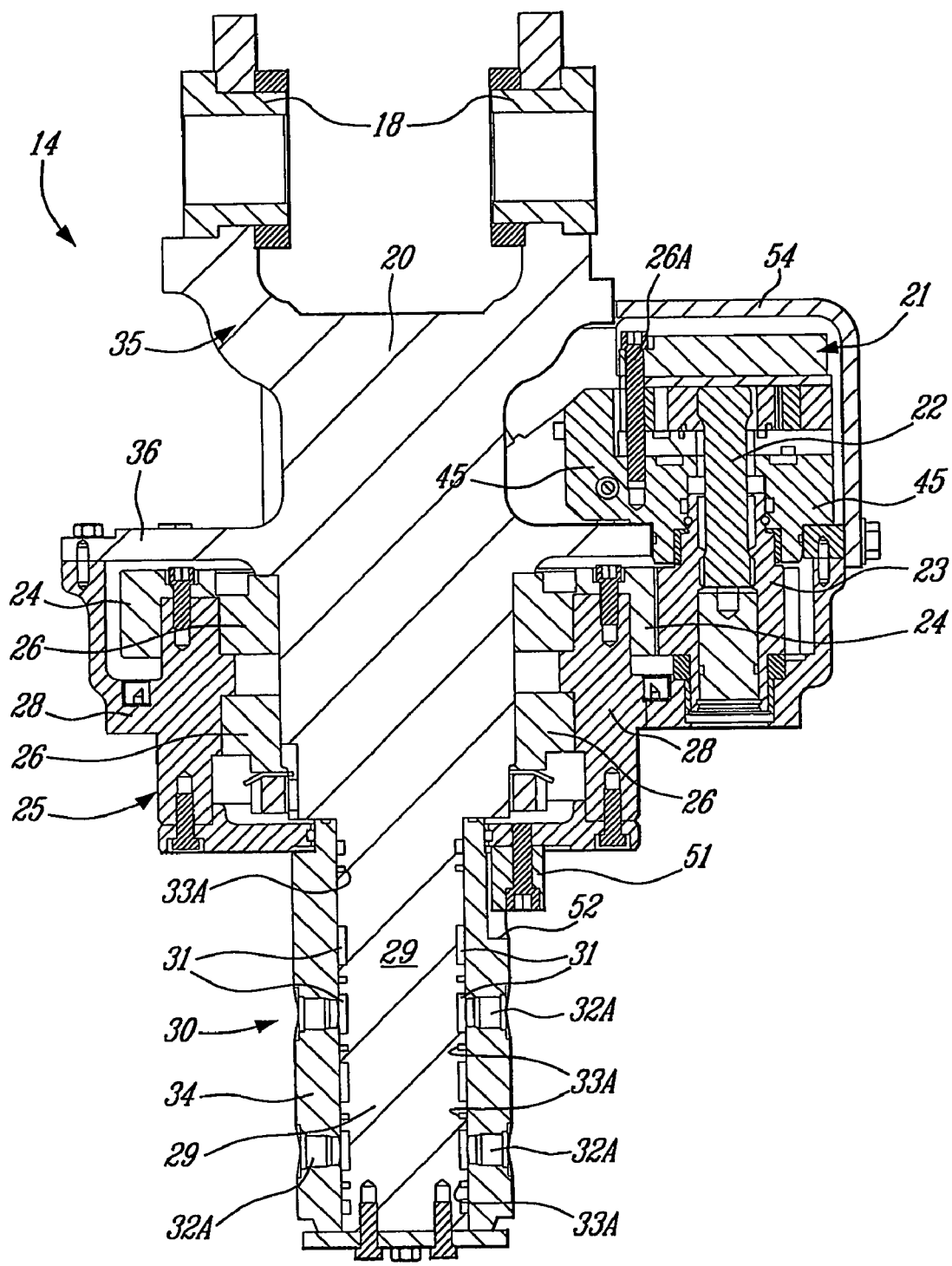
FIG_4

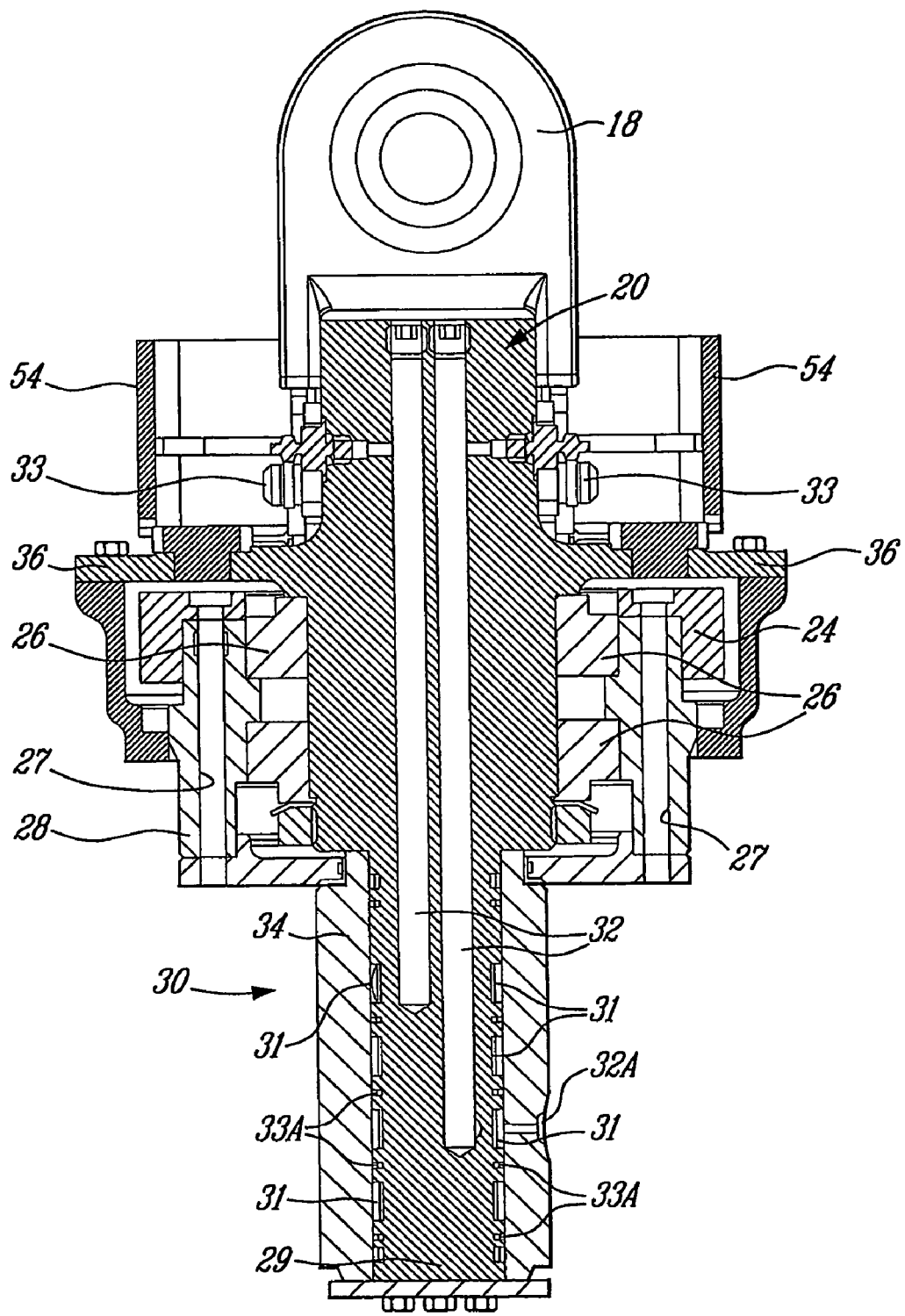
FIG_5

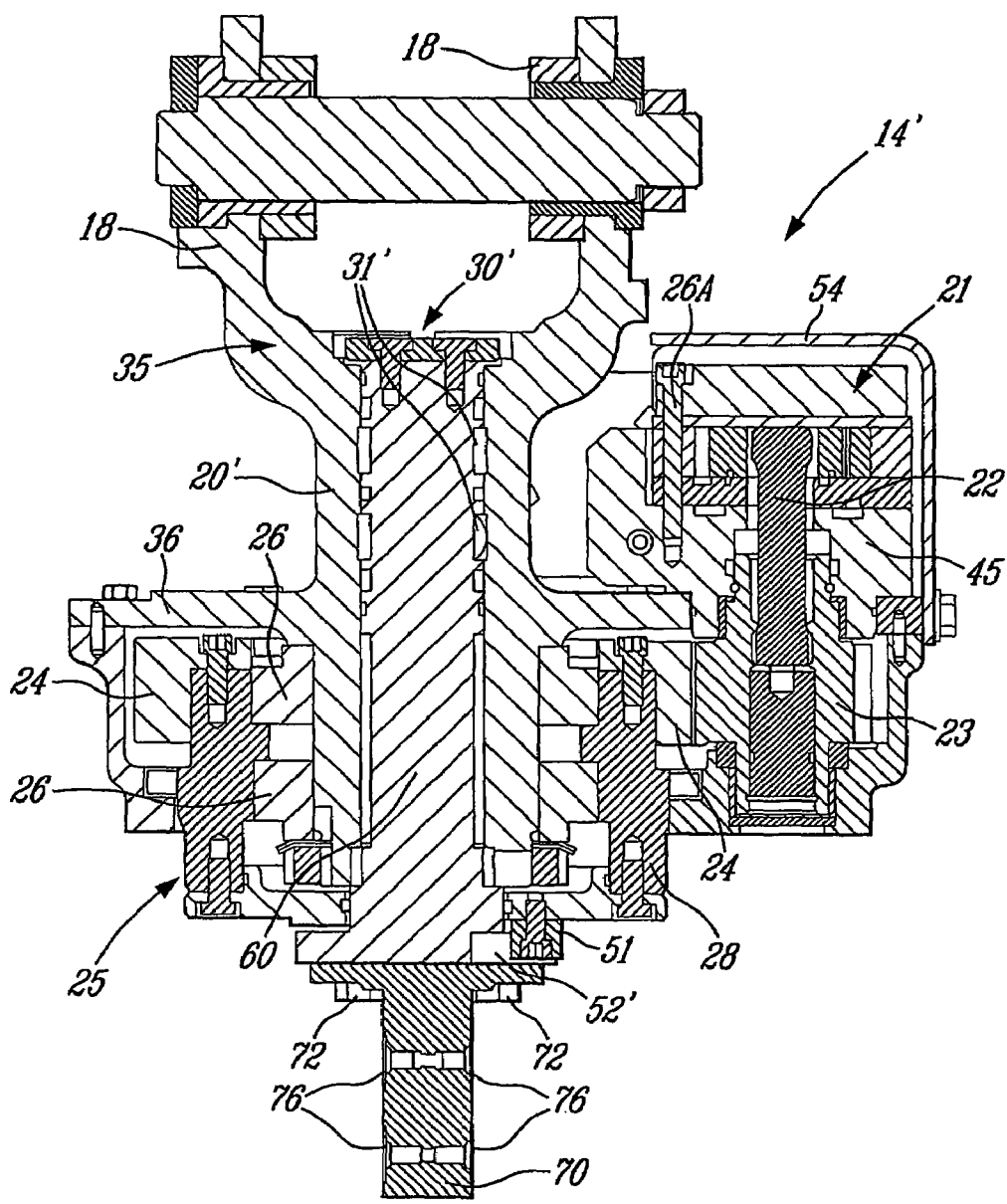
FIG_6

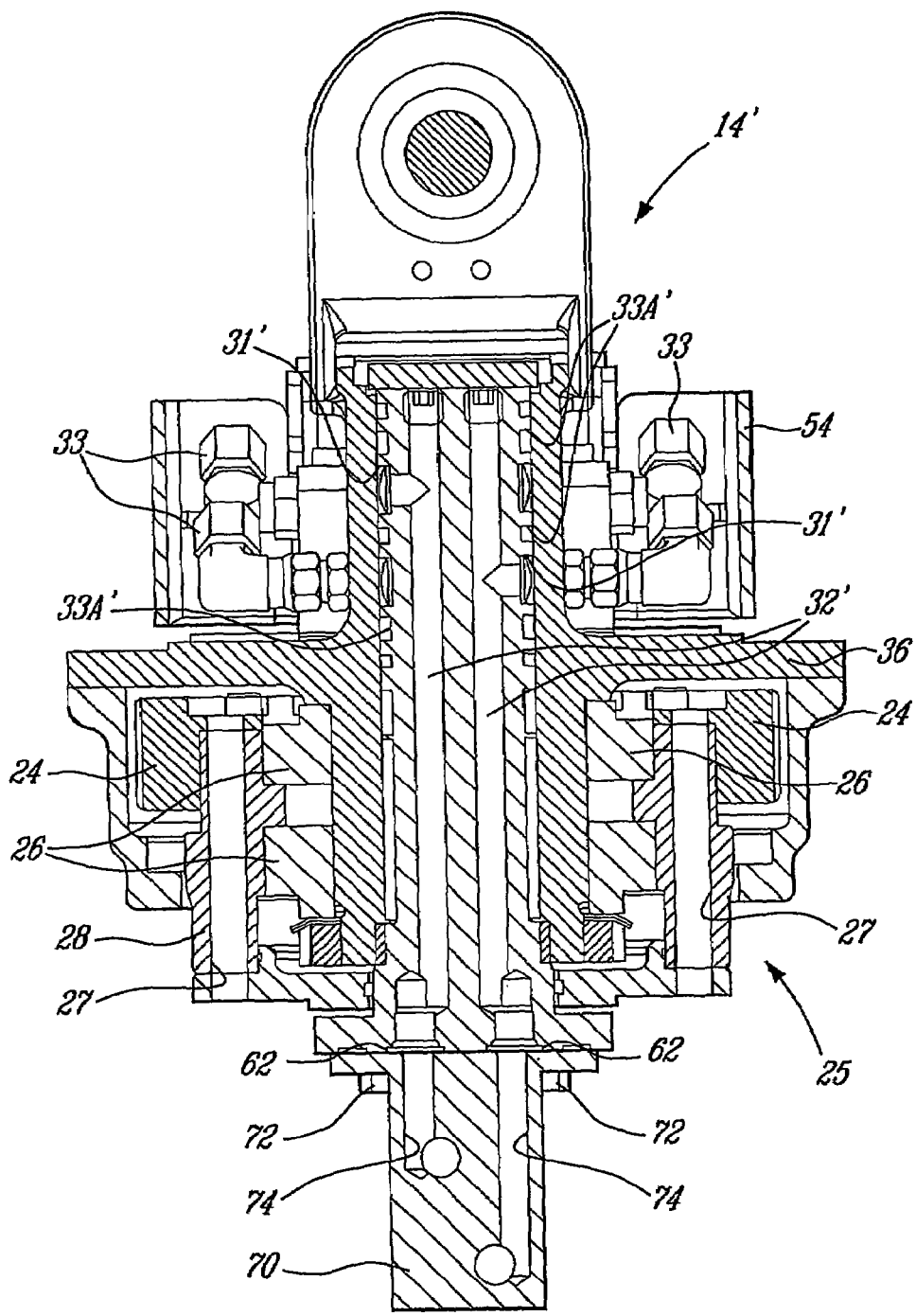
FIG_7

MOTOR-DRIVEN, BOOM-MOUNTED ROTARY COUPLING

CROSS-REFERENCE TO RELATED APPLICATIONS

This application is a national entry of International Patent Application No. PCT/CA02/01111, filed on Jul. 17, 2002, and claims priority on Canadian Patent Application No. 2,353,239, filed Jul. 18, 2001.

TECHNICAL FIELD

The present invention relates to a motor-driven, boom-mounted rotor assembly having a floating collector connected to the main shaft and independent of the load coupling and drive assembly.

BACKGROUND ART

Hydraulically driven rotor assemblies for rotating working implements secured to the end of articulated booms of handling working vehicles are known. However, a disadvantage of some of these rotor assemblies is that they are bulky, difficult to service as they require the dismantling of many and heavy mechanical parts. Some others have the disadvantage that oil leaks often develop in the collector assembly which couples the pressurized hydraulic fluid to the oil pressure lines which are connected to the working implement to actuate its working parts. These oil pressure lines must be displaced with the rotor assembly, as the working implement is swivelled. These rotor assemblies also are capable of continuous rotation about their main shaft. With most prior art rotor assemblies, because the working implement is connected directly to the rotor assembly, the rotor assembly parts are subjected to torque and/or axial loads and/or radial loads. This imparts stress on the collector and causes the wearing of bearings, seals and couplings and the collector eventually develops hydraulic fluid leaks, thereby necessitating servicing and rehauling. Often, it is required to replace the entire rotor assembly and working implement, thereby rendering the working vehicle, such as a tree-handling machine, idle for several hours or days, and this is a very costly process.

Rotors with rotating load-bearing shafts or orientation crown assembly (i.e., slewing ring) are also known. These rotating shafts may also be equipped with a floating collector. However, a disadvantage of these is that the shaft is less resistant to radial loads than a fixed shaft. Also, an orientation crown assembly has proven to be bothersome due to the fact that its diameter must be large to withstand axial loads.

SUMMARY OF INVENTION

It is a feature of the present invention to provide an improved rotor assembly which substantially overcomes the above-mentioned disadvantages of the prior art.

Another feature of the present invention is to provide a rotor assembly wherein the collector is a floating collector independent from the drive and load coupling which is secured to the working implement and thereby unaffected by axial or radial forces.

Another feature of the present invention is to provide an improved rotor assembly wherein the motor and floating collectors can be serviced independently of one another.

Another feature of the present invention is to provide a rotor assembly with a fixed, non-rotating load-bearing shaft capable of withstanding radial loads and which is not equipped with orientation mechanisms which are bothersome.

According to the above features, and from a broad aspect, the present invention provides a rotor assembly for rotating and actuating a working implement, comprising a load-bearing shaft adapted to be mounted to a boom member capable of displacing said rotor assembly; actuation means secured to the load-bearing shaft; a drive assembly rotatably mounted about the load-bearing shaft and being coupled to the actuation means, the drive assembly adapted to be connected to a working implement so as to transmit actuation from the actuation means to the working implement to drive the working implement about the load-bearing shaft; and a collector assembly rotatably mounted about the load-bearing shaft and adapted to receive a pressure supply therefrom, the collector assembly being provided with connector means adapted to provide the working implement with said pressure supply, the collector assembly being coupled to the drive assembly so as to rotate therewith upon actuation from the actuation means, and so as to be independent from the drive assembly to substantially avoid being subjected to loads between the working implement and at least one of the load-bearing shaft and the drive assembly.

BRIEF DESCRIPTION OF DRAWINGS

A preferred embodiment of the present invention will now be described with reference to the accompanying drawings, in which:

FIG. 3A is a perspective view of the rotor assembly of the present invention;

FIG. 3B is a top view of FIG. 3A;

FIG. 4 is a longitudinal section view through the rotor assembly;

FIG. 5 is a longitudinal section view through the load-bearing shaft and the rotor assembly, illustrating the position of some of the hydraulic fluid distribution channels;

FIG. 6 is a longitudinal view of an alternative embodiment of the rotor assembly; and FIG. 7 is a longitudinal section view of the alternative embodiment of the rotor assembly, illustrating the position of the some of the hydraulic fluid distribution channels.

DESCRIPTION OF PREFERRED EMBODIMENTS

Figure 1:
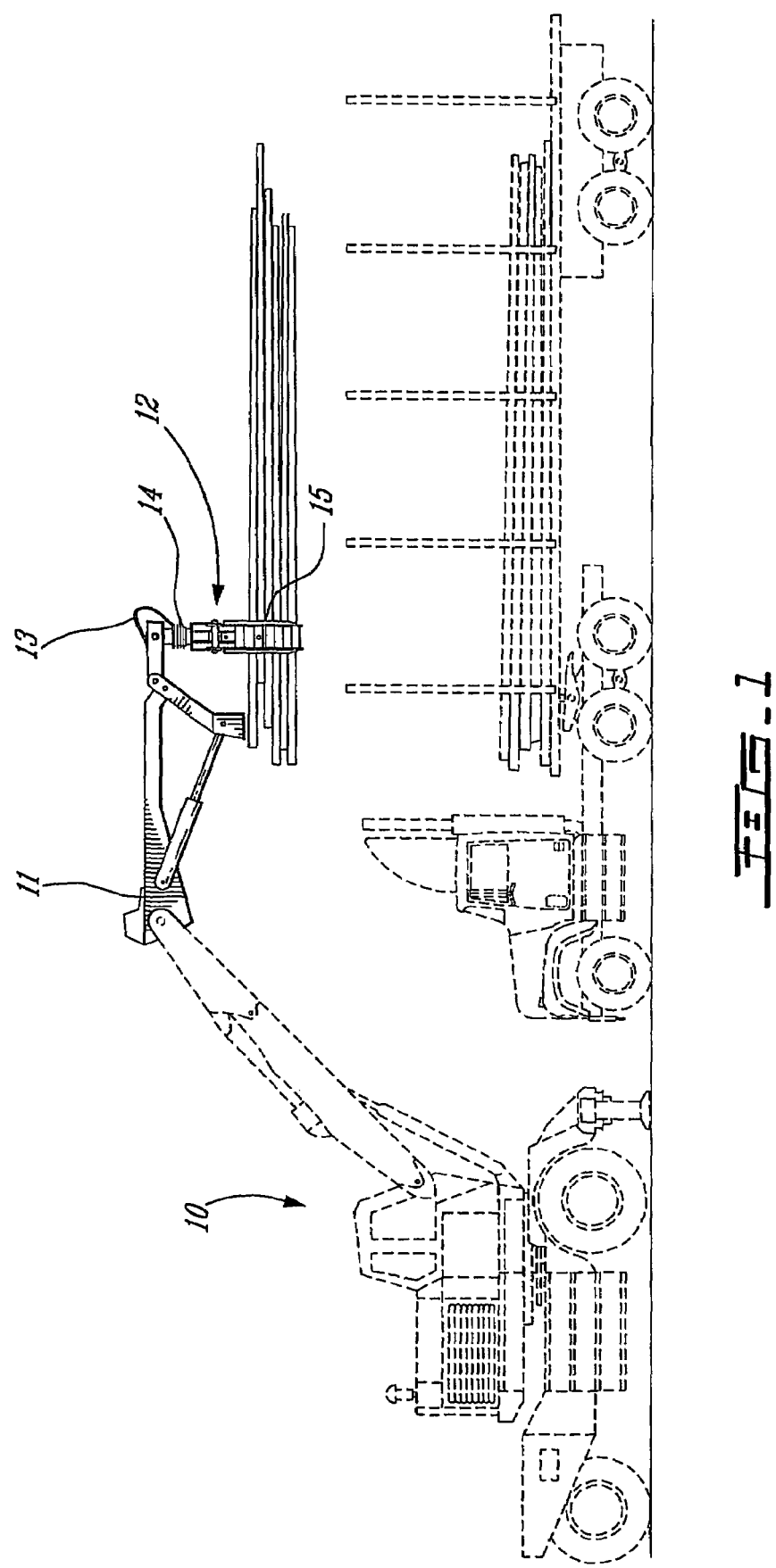
FIG. 1 is a perspective view of a log-loading vehicle provided with a rotor assembly of the present invention as secured to the end of a boom to support a grapple-type working implement.

Referring to the drawings, and more particularly to FIG. 1, there is shown generally at 10 a log-loading vehicle equipped with an articulated boom 11 (or other suitable boom member), at the end of which is supported a working implement 12, more precisely, a grapple. The working implement 12 is supported by a rotor assembly 14. Oil pressure lines 13 feed hydraulic fluid to the rotor assembly 14 which, in turn, connects this working fluid through additional pressure lines to cylinders 16 to actuate the grapple jaws 15.

Figure 2:
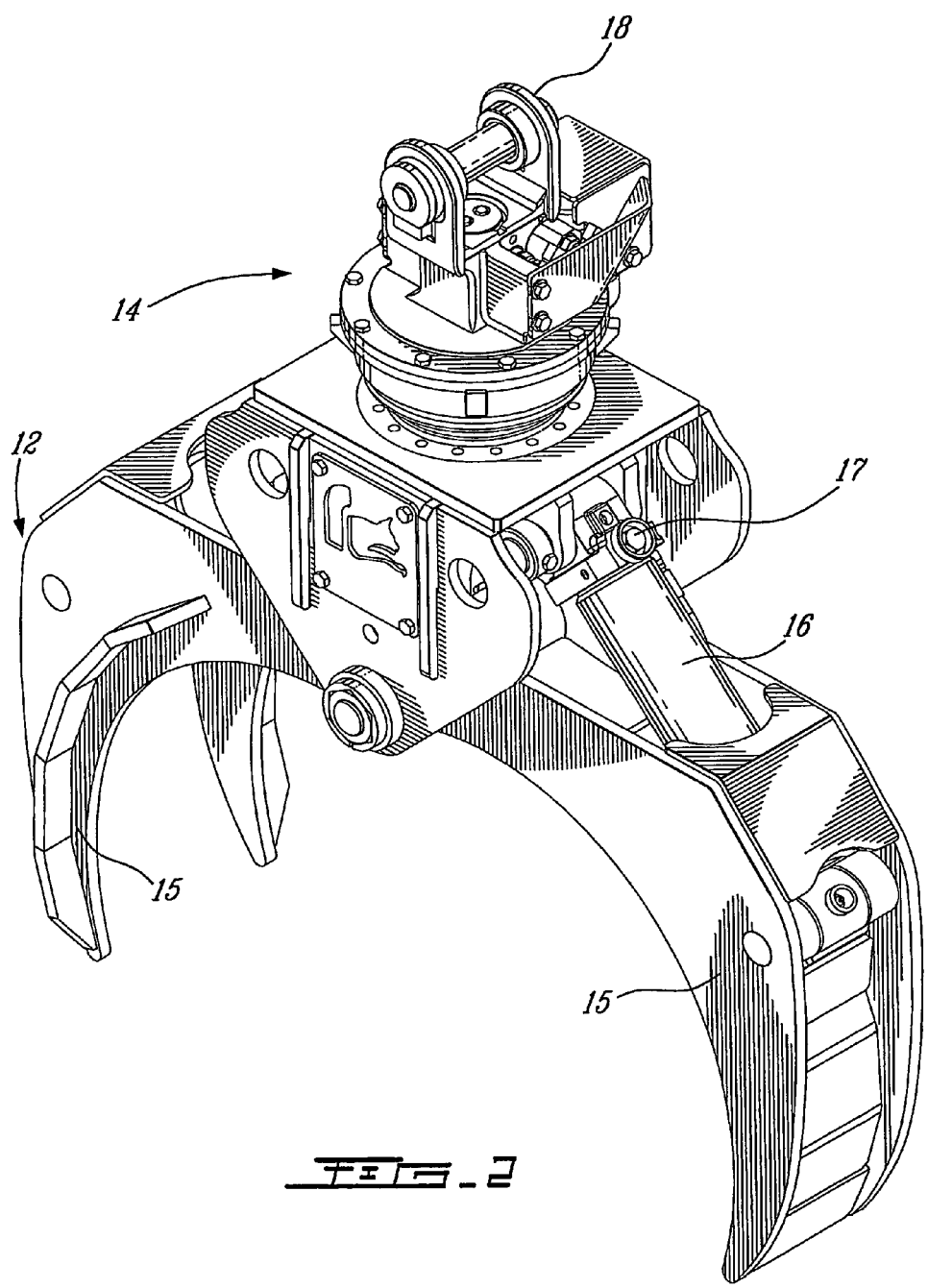
FIG. 2 is a perspective view showing the grapple working implement with the rotor assembly secured thereto.
Figure 3D:
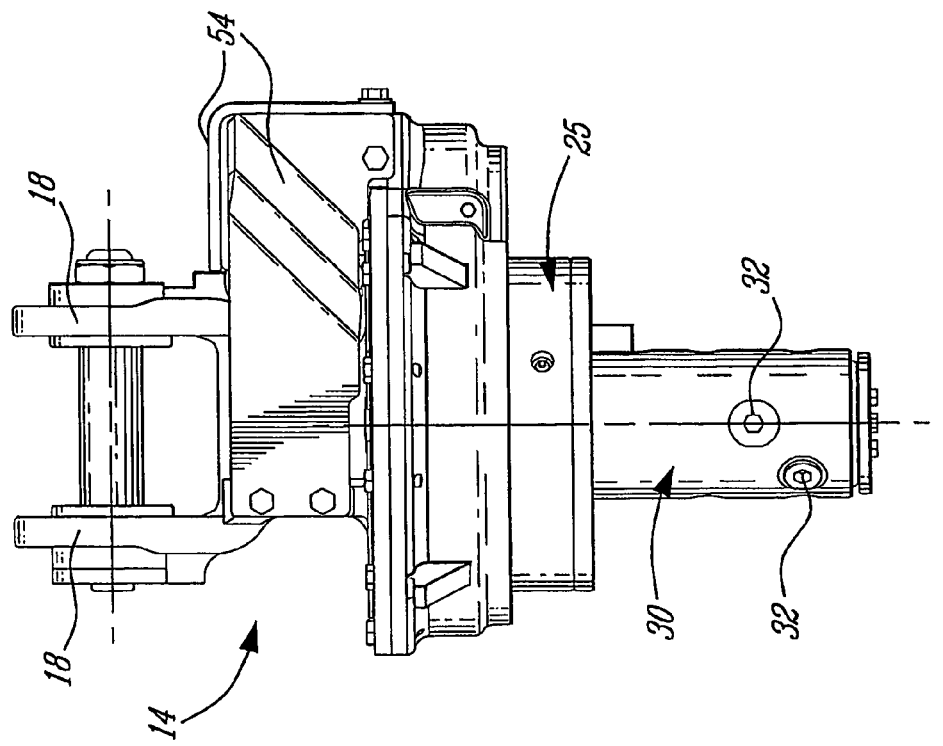
FIG. 3D is a side view of FIG. 3C.
Figure 3C:
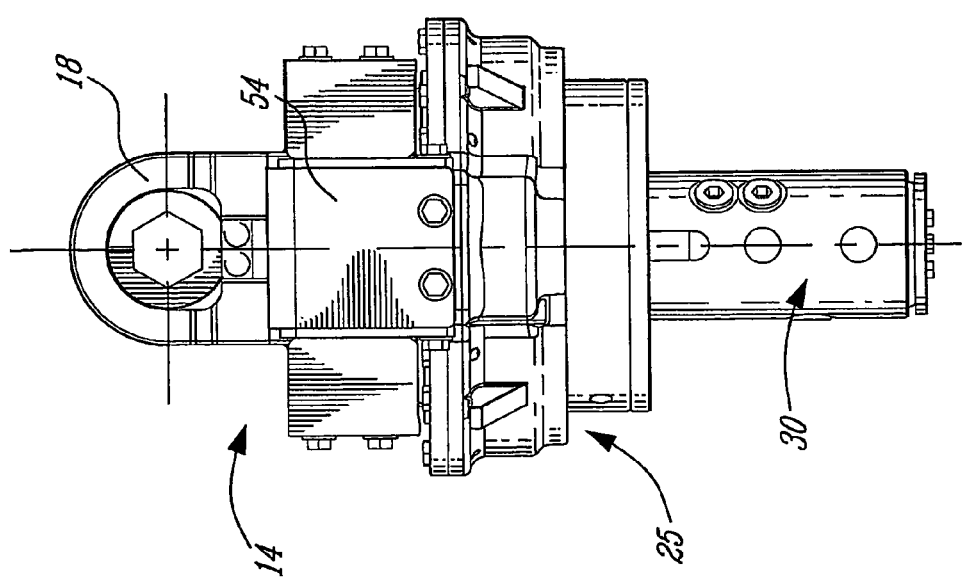
FIG. 3C is a side view of FIG. 3A.

As shown in FIG. 2, the grapple jaw hydraulic cylinders 16 are provided with oil pressure line connectors 17 which are, in turn, connected to the collector assembly, as will be described later, secured to the base of the rotor assembly. The rotor assembly 14 is provided at a top end thereof with connecting flanges 18 for hinge connection to the free end of the articulated boom 11.

With reference now to FIGS. 3A to 5, there will be described the specific construction of the rotor assembly 14 of the present invention. As best seen in FIG. 4, the rotor assembly 14 consists of a load-bearing shaft 20 to which is secured a hydraulic drive motor 21, or other suitable actuation means, provided with a pinion shaft 22 to which is secured a pinion gear 23. The hydraulic motor assembly is mounted or covered by a casing 54 and attached to the shaft 20 through a coupling 45 by means of suitable fasteners 26A.

The pinion gear 23 of the motor 21 is coupled to an annular gear 24 of a load coupling and drive assembly 25, which is secured about the load-bearing shaft 20 and which is driven thereabout on bearings 26. Bolt holes 27 extend through a shroud 28 of the load coupling and drive assembly 25 to receive bolts (not shown) to secure the grapple or other type of working implement 12 to the rotor assembly 14. As the motor 21 rotates the annular gear 24, the entire shroud 28, which is fixed to the annular gear 24, is displaced about the load-bearing shaft 20, thereby rotating the working implement 12, secured thereto through bolt holes 27, about the shaft 20. The implement 12 can be rotated clockwise or counterclockwise and in a continuous fashion about the shaft 20.

The lower end 29 of the shaft 20 is made narrower and receives a floating collector assembly 30. The floating collector assembly 30 has a floating collector jacket 34 (i.e., swivel housing) that freely rotates about the lower end 29 of the load-bearing shaft 20. It is pointed out that the collector assembly 30 can be mounted inside the load-bearing shaft 20, as will be described hereinafter. As can be seen, the lower end 29 of the load-bearing shaft 20 is provided with annular oil distribution channels 31 which are in communication with oil pressure line connectors 32A, which extend through the collector jacket 34. As shown in FIG. 5, these oil distribution channels 31 communicate with supply channels 32 which are bored into the load-bearing shaft 20, and oil is fed to the supply channels 32 through oil line connectors 33, which connect to the oil pressure lines 13, as shown in FIG. 1.

Referring to FIG. 5, it is pointed out that the connectors 32A and 33 connect through a circuit to actuate the jaws 15 of the grapple 12 as shown in FIG. 1. The collector jacket 34 must rotate with the working implement 12 if the former is to supply the latter with hydraulic pressure. Accordingly, the connector 51, which is secured to a bottom portion of the load coupling and drive assembly 25, engages a slot 52 in the collector jacket 34 to cause it to rotate about the shaft 20 and follow the working implement 12. The connector 51 is preferably slightly loose in the slot 52. In this configuration, the floating collector jacket 34 is not integral with the load coupling and drive assembly 25 and, therefore, is not subjected to the loading and torque between the working implement 12, the drive assembly 25 and the shaft 20. Accordingly, seals which are located in sealing channels 33A provided to each side of the oil distribution channels 31 are not subjected to this torquing and wear and, therefore, will have a much longer life. The floating collector jacket 34 will less likely be damaged, as it will also substantially avoid the torquing and the wear. The chances of oil leaking from the oil distribution channels 31 through the floating collector jacket 34 are greatly reduced and the life of the rotor assembly 14 is prolonged.

Referring to FIGS. 6 and 7, an alternative embodiment of the rotor assembly is generally shown at 14'. The rotor assembly 14' serves the same purpose as the rotor assembly 14, which is namely to connect the working implement 12 to the articulated boom 11 of the vehicle 10, enabling the working implement 12 to be actuated and rotated. The rotor assembly 14' generally has the same components as the rotor assembly 14, and these same components will bear the same reference numerals. Additional or modified components to the rotor assembly 14' will be primed (e.g., rotor assembly 14'). The rotor assembly 14' has the hydraulic drive motor 21, the pinion shaft 22 and the pinion gear 23. The casing 54 covers the hydraulic drive motor 21. The rotor assembly 14' has a load-bearing shaft 20', and the hydraulic motor assembly is mounted to the load-bearing shaft 20' by the coupling 45 and the suitable fasteners 26A.

The annular gear 24, which is part of the load coupling and drive assembly 25, is secured to the load-bearing shaft 20' and is driven thereabout on the bearings 26. The bolt holes 27 extend through the shroud 28 of the drive assembly 25, to receive bolts (not shown) to secure the working implement 12 to the rotor assembly 14'. The working implement 12 is rotatingly coupled to the motor 21 through the annular gear 24 and the drive assembly 25, which includes the entire shroud 28.

The differences between the rotor assembly 14' and the rotor assembly 14 reside in the floating collector assembly 30. In the rotor assembly 14, the floating collector assembly 30 has the collector jacket 34 that is rotatably mounted onto the lower end 29 of the shaft 20. In the rotor assembly 14', the load-bearing shaft 20' is hollow and incorporates the collector assembly 30'. The collector assembly 30' has a collector shaft 60 journaled in the load-bearing shaft 20'. The collector shaft 60 has supply channels 32' bored therein, and these supply channels 32' are in fluid communication with annular oil distribution channels 31' on a surface of the collector shaft 60. The oil pressure line connectors 33 are secured to a surface of the load-bearing shaft 20' and are in fluid communication with the annular oil distribution channels 31' so as to supply or receive oil from the supply channels 32'. Seals are received in sealing channels 33A' provided to each side of the oil distribution channels 31' to prevent leaks between the load-bearing shaft 20' and the collector shaft 60.

The supply channels 32' define openings 62 at a bottom surface of the collector shaft 60. Although the collector shaft 60 is shown having an attachment 70, which will be described in further detail hereinafter, fluid lines may extend directly from the openings 62 to the cylinders 16 of the working implement 12, so as to supply hydraulic pressure thereto. The connector 51 of the drive assembly 25 is received in a slot 52' in the collector shaft 60, such that the collector shaft 60 rotates with the drive assembly 25, while remaining independent therefrom. The connector 51 is preferably slightly loose in the slot 52'. Therefore, similarly to the rotor assembly 14, the rotor assembly 14' has its floating collector assembly 30' separated from the load coupling and drive assembly 25, such that the former is isolated from the loading and the torque between the working implement 12, the drive assembly 25 and the shaft 20'. Accordingly, the life of the floating collector 30' is prolonged.

The attachment 70 is optionally provided with the collector shaft 60, and is secured thereto by suitable fasteners 72. The attachment 70 has supply channels 74 that are each continuous with one of the supply channels 32' in the collector shaft 60. The attachment 70 has openings 76 on an outer surface thereof in fluid communication with one of the supply channels 74, adapted for receiving fluid lines that will supply hydraulic pressure to the working implement 12. It is pointed out that the attachment 70 is optionally provided with two openings 76 for each supply channel 74, and could be provided with additional openings.

The attachment 70 enables the rotor assembly 14' to adapt to various dimensions of working implements 12, with various requirements in degrees of actuation. For instance, the rotor assembly 14' can be provided with various sizes and configurations of attachments 70, each attachment 70 being configured for a specific working implement 12.

Another feature of the design of both the rotor assemblies 14 and 14' is the compactness, including the motor 21 being mated very close to the load-bearing shafts 20 and 20', respectively, by means of the coupling, which is herein shown as the compact support base 45 that fits under the fork 35 to which the connecting flanges 18 are secured. The main shafts 20 and 20' are also provided with a circumferential flange 36, under which the load coupling and drive assembly 24 is mounted and protected.

Another feature of the assemblies 14 and 14' is that the motor can be serviced by simply removing the casing 54 which provides access thereto. By removing the bolts 26, the entire motor 21 can be removed for servicing and replaced immediately with a new one, thereby not disabling the rotor assembly and the vehicle for a very long period of time. Similarly, the floating collector 30 of the rotor assembly 14 can be serviced without dismantling the load coupling and drive assembly 25 and the motor assembly.

The proximity between the load coupling and drive assembly 25 and the connecting flanges 18 for both the rotor assemblies 14 and 14' renders the shafts 20 and 20', respectively, more resistant to radial loads. For instance, the shafts 20 and 20' are less subject to failure when loads are pulled laterally, e.g., in pull-through delimbing.

It is within the ambit of the present invention to cover any obvious modifications of the preferred embodiment described herein, provided such modifications fall within the scope of the appended claims.

The invention claimed is:

1. A continuous rotor assembly for rotating and actuating a working implements comprising:
    a load-bearing shaft adapted to be mounted to a boom member displacing said rotor assembly;
    actuation means secured to the lead-bearing shaft;
    a drive assembly rotatably mounted about the load-bearing shaft for continuous rotation with respect to the load-bearing shaft and being coupled to the actuation means, the drive assembly adapted to be connected to a working implement so as to transmit actuation from the actuation means to the working implement to drive the working implement about the load-bearing shaft; and
    a collector assembly having a collector shaft rotatably mounted to the load-bearing shaft and concentrically positioned in the load-bearing shaft, the collector shaft being adapted to receive a pressure supply therefrom, the collector shaft being provided with openings at an end thereof and being adapted to provide the working implement with said pressure supply, the collector assembly being coupled to the drive assembly so as to rotate therewith upon actuation from the actuation means, while not being integral with the drive assembly to substantially avoid being subjected to loads between the working implement and at least one of the load-bearing shaft and the drive assembly.

2. The rotor assembly accord:Lng to claim 1, wherein the drive assembly is a shroud rotatably mounted to the load-bearing shaft by at least one bearing.

3. The rotor assembly according to claim 2, wherein an annular gear is provided on an outer surface of the shroud, the annular gear being in operative engagement with a pinion gear of the actuation means.

4. The rotor assembly according to claim 1, wherein the actuation means is a hydraulic drive motor.

5. The rotor assembly according to claim 1, wherein the collector assembly has annular channels on an outer surface thereof in fluid communication with a pressure supply of said load-bearing shaft, the annular channels further being in fluid communication with supply channels in said collector shaft, the supply channels extending to said openings.

6. The rotor assembly according to claim 1, wherein said end of the collector shaft has a flange, the drive assembly and the collector assembly being coupled by a connector protruding from one of said flange and the drive assembly and received in a slot of the other of said flange and the drive assembly.

7. The rotor assembly according to claim 1, wherein an attachment is detachably secured to said end of the collector shaft, the attachment having a supply channel continuous with each said opening, with further connector means on an outer surface of said attachment in fluid communication for providing the working implement with said pressure supply through said further connector means.

8. The rotor assembly according to claim 7, wherein at least one of said supply channel of said attachment is in fluid communication with at least two of said further connector means, to provide at least two degrees of actuation through one of said supply channels of said attachment.

9. The rotor assembly according to claim 1, wherein the actuation means is covered by a casing detachably secured to said load-bearing shaft.

10. The rotor assembly according to claim 1, wherein the actuation means is accessible for servicing without removing the working implement.

11. The rotor assembly according to claim 1, wherein the drive assembly is positioned in proximity to said boom member connected to said load-bearing shaft, so as to reduce shearing loads on said load-bearing shaft.

* * * * *